UNITED STATES PATENT OFFICE.

CHRISTOPH SUSSEGGER, OF NEW YORK, N. Y.

IMPROVED BEVERAGE.

Specification forming part of Letters Patent No. 55,737, dated June 19, 1866.

*To all whom it may concern:*

Be it known that I, CHRISTOPH SUSSEGGER, of the city of New York, in the county and State of New York, have invented a new and useful Beverage, which I name "American Sherbet;" and to enable others skilled in the art to make and use my said invention I do hereby declare that the following is a full and exact description thereof and of the mode and manner of making and producing the same.

There is neither machinery nor any expensive apparatus required to make this American sherbet. Hogsheads, barrels, or kegs, and rooms that can be warmed will suffice for the purpose.

The ingredients I use are water, sugar, tartaric acid, linden-blossoms, yeast, and rose-leaves; and the proportions of each are about the following, to-wit: ten gallons of water, seven pounds of sugar, two ounces of tartaric acid, one ounce of linden-blossoms, four ounces of yeast, and eight ounces of rose-leaves. The process is begun in a room warmed up to 20° to 30° Fahrenheit. The sugar is dissolved in a keg containing the water, and thereupon the tartaric acid is added and the whole stirred so as to mix well. Of the solution thus produced, one gallon is then taken out of the keg and is thoroughly mixed with the yeast, and after having thus been mixed, that yeasted gallon is poured back into the keg, and the whole solution is thoroughly stirred and mixed in the keg, so as to facilitate the action of the yeast. Tied up into a bag or rag, the linden-blossoms are then hung into the keg, and the keg is well closed for a three or four days' first strong fermentation. During this first fermentation the keg is being opened occasionally for a few minutes, for the purpose of pressing the linden-blossoms, and the essence pressed out of them, as well as the bag containing them, are as regularly put back into the keg before the latter is tightly closed again. After this first strong fermentation is over the whole solution is drawn into a fresh keg in such a manner as to leave in the first keg all the yeast possible, for the yeast by that time has settled at the bottom of the first keg, and the fresh keg, with the solution in it, is then placed for two days into a cellar having a temperature of about 10° Fahrenheit, whereby the fermentation is interrupted and the solution considerably cleared. At the end of these two days the keg and its contents are transferred back to the warm working-room for a second fermentation of from four to six days, and at the end of this second fermentation I color the solution by straining into it the scalded rose-leaves. The solution is then ready for bottling; but as in the bottles a third and last fermentation is desirable, I put about a tea-spoonful of sugar into every half-pint bottle before filling it, and after filling it cork it tightly, shake it well, and allow it to remain in the warm room from two to four additional days before putting it into the market.

The weather, the heat in the room, and the quality and action of the yeast will in each separate case have to be considered in allowing any given time for fermentation.

From all of the foregoing it will easily be perceived that while I confine myself in substance to the process above described, I need not, and do not, confine myself to the particular ingredients or their proportions mentioned, for all these could be changed and varied to correspond with the taste or cost of production to be obtained. For instance, instead of tartaric acid I could use lemon-juice, fresh cider, wine, or other substance; instead of linden-blossoms I could use grape-vi o tea, beech-leaves, and the like, and for coloring-matter malven-leaves, cochineal, or similar substances might take the place of rose-leaves.

Having thus fully described my American sherbet and the mode and manner of making and producing the same, I claim as my invention, and desire to secure by Letters Patent of the United States, the following, to wit:

1. The American sherbet, as a new article of manufacture.

2. The manufacture of a beverage by a process substantially as hereinbefore set forth and described.

3. The combination of water, sugar, tartaric acid, yeast, linden-blossoms, and rose-leaves, or their equivalents, for the production of a beverage or sherbet, substantially as hereinbefore set forth and described.

CHRISTOPH SUSSEGGER.

Witnesses:
M. PINNER,
B. CHICMAR.